United States Patent
Lee

(10) Patent No.: US 7,792,551 B2
(45) Date of Patent: Sep. 7, 2010

(54) METHOD FOR DISPLAYING AN INCOMING CALL ALERT OF A MOBILE PHONE AND THE MOBILE PHONE THEREOF

(75) Inventor: Shih-Hsin Lee, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 468 days.

(21) Appl. No.: 11/967,128

(22) Filed: Dec. 29, 2007

(65) Prior Publication Data
US 2009/0137285 A1   May 28, 2009

(30) Foreign Application Priority Data
Nov. 26, 2007   (CN) .................. 2007 1 0202665

(51) Int. Cl.
*H04M 1/00* (2006.01)
*H04B 1/38* (2006.01)
(52) U.S. Cl. .............. 455/567; 455/566; 455/569.1
(58) Field of Classification Search ............. 455/567, 455/566, 569.1
See application file for complete search history.

(56) References Cited

U.S. PATENT DOCUMENTS

| | | | |
|---|---|---|---|
| 6,725,064 B1 * | 4/2004 | Wakamatsu et al. | 455/566 |
| 6,801,793 B1 * | 10/2004 | Aarnio et al. | 455/566 |
| 7,542,773 B2 * | 6/2009 | Koch | 455/466 |
| 2007/0042801 A1 | 2/2007 | Miyata | |
| 2009/0312062 A1 * | 12/2009 | Horodezky et al. | 455/566 |

* cited by examiner

*Primary Examiner*—Tilahun Gesesse
(74) *Attorney, Agent, or Firm*—Frank R. Niranjan

(57) ABSTRACT

A method for displaying an incoming call alert of a mobile phone is disclosed. The method includes the steps of: obtaining an image from a storage of the mobile phone; converting the image to a vector graph according to an algorithm for generating a vector graph, the vector graph being a cartoon image; obtaining a music file from the storage of the mobile phone; merging the vector graph and the music file thereby generating an animation file, setting a caller corresponding to the animation file, and storing the animation file and the caller information in the storage; invoking an animation file corresponding to a caller when an incoming call by the caller is received, and playing the animation file. A related mobile phone is also disclosed.

8 Claims, 3 Drawing Sheets

METHOD FOR DISPLAYING AN INCOMING CALL ALERT OF A MOBILE PHONE AND THE MOBILE PHONE THEREOF

BACKGROUND OF THE INVENTION

1. Field of the Invention

The present invention relates to a method for displaying an incoming call alert of a mobile phone and the mobile phone thereof.

2. Description of Related Art

In our modern information-oriented society where communication systems are highly developed, compact-sized mobile phones are broadly utilized for communications between people in daily life. Mobile phones can be used to exchange information and communicate with each other almost anytime and anywhere. Thus, it is a trend to develop fast processing speed and easy to use mobile phone.

Currently, the mobile phone can display a stored image of a caller, and also play a ring tone when an incoming call is received. However, the image of the caller is displayed in a static mode, and the displaying of the image is independent of the playing of the ring tone.

Therefore, what is needed is a method for displaying an incoming call alert of a dynamic image along with a music file on a mobile phone and the mobile phone thereof.

SUMMARY OF THE INVENTION

A mobile phone includes an incoming call alert management unit. The incoming call alert management unit includes an image obtaining module, an image converting module, a music file obtaining module, a merging module, and a playing module. The image obtaining module is configured for obtaining an image from a storage of the mobile phone. The image converting module is configured for converting the image to a vector graph according to an algorithm for generating a vector graph, the vector graph is a cartoon image. The music file obtaining module is configured for obtaining a music file from the storage of the mobile phone. The merging module is configured for merging the vector graph and the music file thereby generating an animation file, setting a caller corresponding to the animation file, and storing the animation file and the caller information in the storage. The playing module is configured for invoking an animation file corresponding to a caller when an incoming call by the caller is received, and playing the animation file.

A method for displaying an incoming call alert of a mobile phone is also provided. The method includes the steps of: obtaining an image from a storage of the mobile phone; converting the image to a vector graph according to an algorithm for generating a vector graph, the vector graph being a cartoon image; obtaining a music file from the storage of the mobile phone; merging the vector graph and the music file thereby generating an animation file, setting a caller corresponding to the animation file, and storing the animation file and the caller information in the storage; invoking an animation file corresponding to a caller when an incoming call by the caller is received, and playing the animation file.

Other systems, methods, features, and advantages of the present invention will become apparent to one with skill in the art upon examination of the following drawings and detailed description.

DETAILED DESCRIPTION OF THE INVENTION

Figure 1:
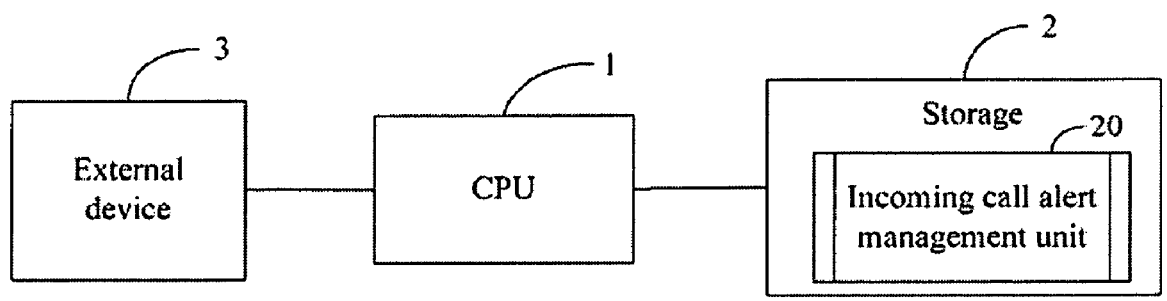
FIG. 1 is a schematic diagram of hardware configuration of a mobile phone in accordance with a preferred embodiment.

FIG. 1 is a schematic diagram of hardware configuration of a mobile phone in accordance with a preferred embodiment. The mobile phone typically includes a central processing unit (CPU) 1, a storage 2, and an external device 3. The CPU 1 electronically connects with the storage 2 and the external device 3. The storage 2 stores images and music files (such as MP3 songs) used in the mobile phone. The storage 2 further stores an incoming call alert management unit 20. The incoming call alert management unit 20 is configured for converting an image of a caller to a vector graph (i.e., a cartoon image), merging the cartoon image and a music file thereby generating an animation file. Thus, the mobile phone can display the cartoon image dynamically and play the music file as an animation file at the same time when an incoming call by the caller is received.

The CPU 1 is configured for loading the incoming call alert management unit 20 to a memory of the mobile phone, and controlling the incoming call alert management unit 20. The storage 2 may be a read-only memory (ROM) storage, and the memory may be a dynamic random access memory (DRAM) or a synchronous DRAM (SDRAM). The external device 3 may include a liquid crystal display (LCD) screen and a keyboard.

Figure 2:
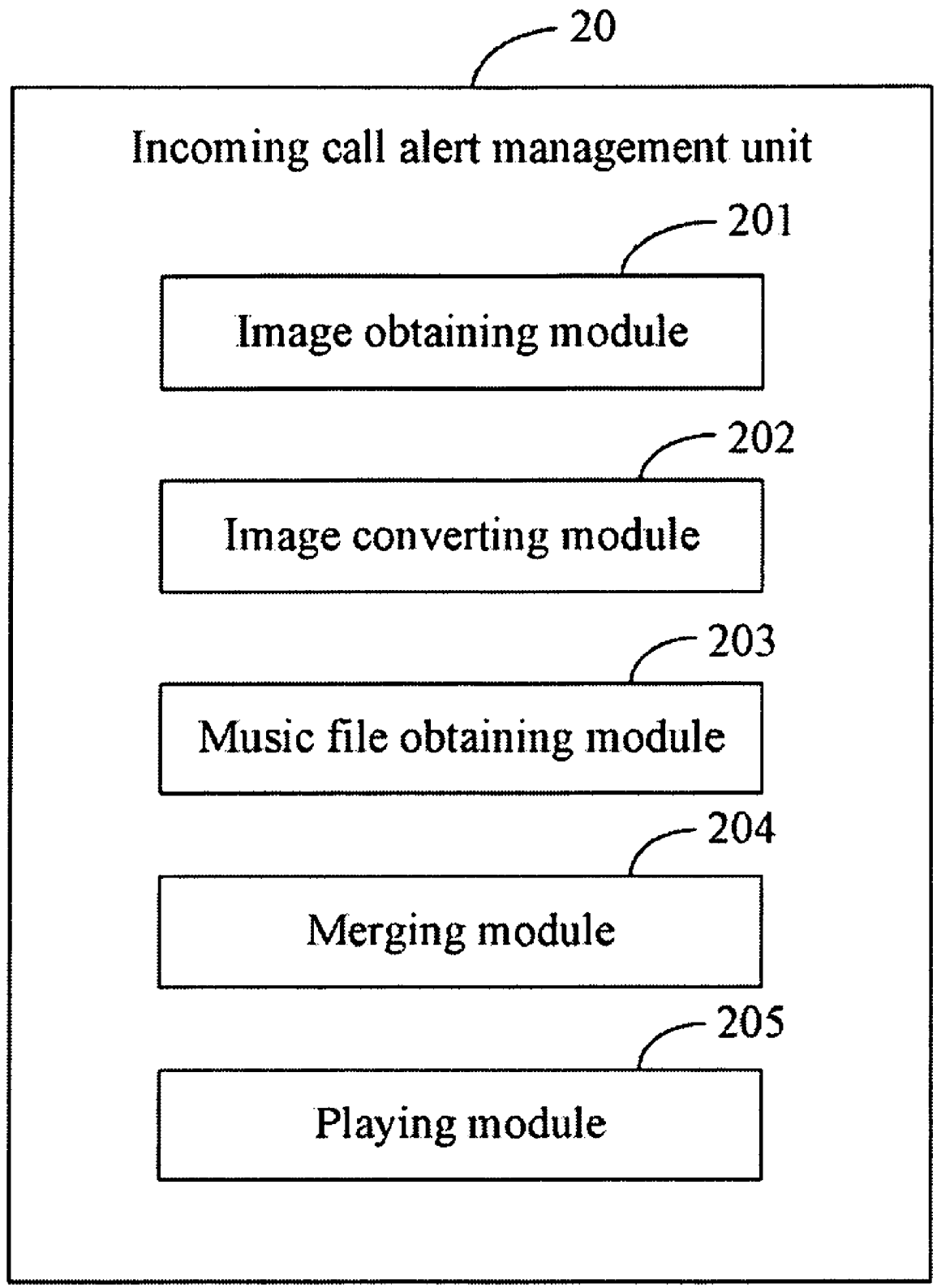
FIG. 2 is a schematic diagram showing function modules of an incoming call alert management unit of FIG. 1.

FIG. 2 is a schematic diagram showing function modules of the incoming call alert management unit 20 of FIG. 1. The incoming call alert management unit 20 may include an image obtaining module 201, an image converting module 202, a music file obtaining module 203, a merging module 204, and a playing module 205.

The image obtaining module 201 is configured for obtaining an image of a caller from the storage 2 of the mobile phone. The storage 2 can stored image obtained via the mobile phone or any other electronic device such as a personal computer.

The image converting module 202 is configured for converting the image to a vector graph (i.e., a cartoon image) according to an algorithm for generating a vector graph. In this preferred embodiment, an algorithm of a low complexity to generate the vector graph, such as the Real-Time Video Abstraction algorithm, is used.

Specifically, the method of generating the vector graph using the Real-Time Video Abstraction algorithm may include the following steps: at first, the image converting module 202 obtains an image of a person's face by using a skin color model in YCbCr space. In YCbCr, the Y is the brightness (luma), Cb is blue minus luma (B-Y), and Cr is red minus luma (R-Y). Then, the image converting module 202 obtains the main features of the image of the person's face according to an RGB (Red, Green, Blue) theory, obtains a high luminance image and an edge of the main features of the person's face, combines the high luminance image and the edge of the main features of the person's face thereby generating a combined image, and sets a color of the combined image according to the color of the facial skin in the image. Lastly, the image converting module 202 performs a vectorization operation on the image thereby generating the cartoon image of the image.

The music file obtaining module 203 is configured for obtaining a music file (such as an MP3 file) from the storage 2 of the mobile phone. The storage 2 can stored music file obtained via the mobile phone or any other electronic device such as a personal computer.

The merging module 204 is configured for merging the cartoon image and the music file thereby generating an animation file, setting a caller corresponding to the animation file, and storing the animation file and the caller information in the storage 2. A detailed description is as follows. In the preferred embodiment, the merging module 204 merges the vector graph and the music file including, but not limited to: setting an interval of a mouth action in the cartoon image, setting an interval of a head action in the cartoon image, and assigning the music file to the cartoon image. The frequency of the mouth action may be set according to the rhythm of the lyrics in the music. The frequency of the head action may also be set according to the rhythm of the music. The head action may include actions of shaking and blinking. In other embodiments, if there are no lyrics in the music file, only the interval of the head action needs to be set through the merging module 204. In such a case, a smile, as a facial expression can be set to follow the rhythm of the music.

The playing module 205 is configured for invoking an animation file corresponding to a caller when an incoming call by the caller is received, and playing the animation file. Thus, the cartoon image will be displayed dynamically on the LCD screen along with the music file.

In the preferred embodiment, the merging module 204 merges the cartoon image of each caller with one music file. In other embodiments, the merging module 204 can merge the cartoon image of each caller with plural music files. In such a case, when an incoming call by a caller is received, the playing module 205 selects a music file randomly from plural music files stored in an animation file corresponding to the caller, and plays the selected music file with a cartoon image in the animation file at the same time.

Figure 3:
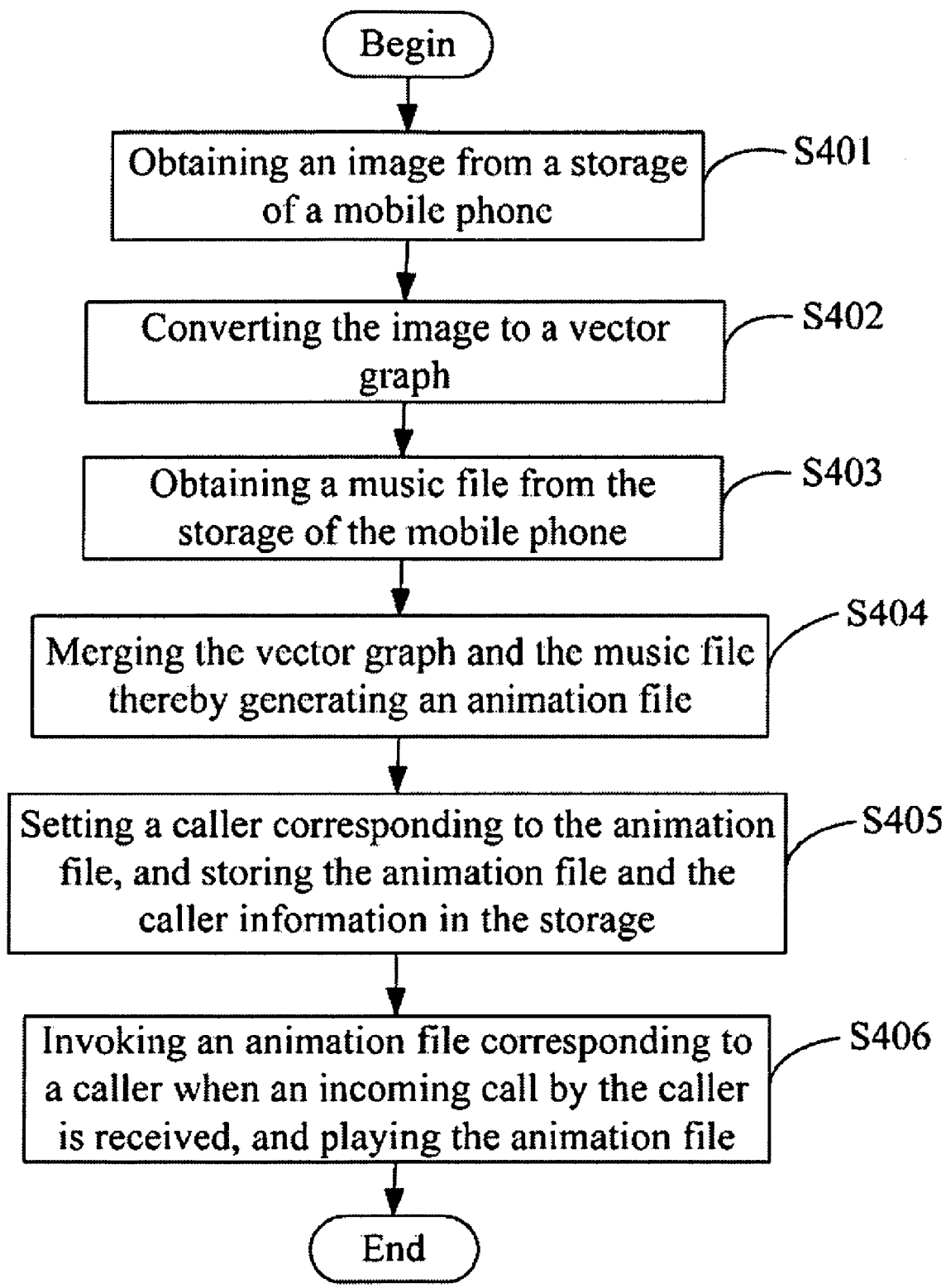
FIG. 3 is a flowchart of a preferred method for displaying an incoming call alert of a mobile phone in accordance with one embodiment.

FIG. 3 is a flowchart of a preferred method for displaying an incoming call alert of a mobile phone in accordance with one embodiment. In step S401, the image obtaining module 201 obtains an image of a caller from the storage 2 of the mobile phone.

In step S402, the image converting module 202 converts the image to a vector graph (i.e., a cartoon image) according to an algorithm for generating a vector graph. In this preferred embodiment, an algorithm of a low complexity to generate the vector graph, such as the Real-Time Video Abstraction algorithm, is used.

Specifically, the method of generating the vector graph using the Real-Time Video Abstraction algorithm may include the following steps: at first, the image converting module 202 obtains an image of a person's face by using a skin color model in YCbCr space. Then, the image converting module 202 obtains the main features of the image of the person's face according to an RGB theory, obtains a high luminance image and an edge of the main features of the person's face, combines the high luminance image and the edge of the main features of the person's face thereby generating a combined image, and sets a color of the combined image according to the color of the facial skin in the image. Lastly, the image converting module 202 performs a vectorization operation on the image thereby generating the cartoon image of the image.

In step S403, the music file obtaining module 203 obtains a music file (such as an MP3 file) from the storage 2 of the mobile phone.

In step S404, the merging module 204 merges the cartoon image and the music file thereby generating an animation file. A detailed description is as follows. In the preferred embodiment, the merging module 204 merges the vector graph and the music file including, but not limited to: setting an interval of a mouth action in the cartoon image, setting an interval of a head action in the cartoon image, and assigning the music file to the cartoon image. The frequency of the mouth action may be set according to the rhythm of the lyrics in the music. The frequency of the head action may also be set according to the rhythm of the music. The head action may include actions of shaking and blinking. In other embodiments, if there are no lyrics in the music file, only the interval of the head action needs to be set through the merging module 204. In such a case, a smile, as a facial expression can be set to follow the rhythm of the music.

In step S405, the merging module 204 sets a caller corresponding to the animation file, and storing the animation file and the caller information in the storage 2.

In step S406, the playing module 205 invokes an animation file corresponding to a caller when an incoming call by the caller is received, and plays the animation file. Thus, the cartoon image will be displayed dynamically on the LCD screen along with the music file.

In the preferred embodiment, the merging module 204 merges the cartoon image of each caller with one music file. In other embodiments, the merging module 204 can merge the cartoon image of each caller with plural music files. In such a case, when an incoming call by a caller is received, the playing module 205 selects a music file randomly from plural music files stored in an animation file corresponding to the caller, and plays the selected music file with a cartoon image in the animation file at the same time.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. For example, the method can be used in a hand-held electronic devices such as a Personal Digital Assistant (PDA). All such modifications and variations are intended to be included herein within the scope of this disclosure and the present invention and protected by the following claims.

What is claimed is:

1. A mobile phone, comprising an incoming call alert management unit, the incoming call alert management unit comprising:
   an image obtaining module being configured for obtaining an image from a storage of the mobile phone;
   an image converting module being configured for converting the image to a vector graph according to an algorithm for generating a vector graph, the vector graph being a cartoon image;
   a music file obtaining module being configured for obtaining a music file from the storage of the mobile phone;
   a merging module being configured for merging the vector graph and the music file thereby generating an animation file, setting a caller corresponding to the animation file, and storing the animation file and the caller information in the storage; and
   a playing module being configured for invoking an animation file corresponding to a caller when an incoming call by the caller is received, and playing the animation file.

2. The mobile phone according to claim 1, wherein the algorithm for generating a vector graph is a Real-Time Video Abstraction algorithm.

3. The mobile phone according to claim 1, wherein the merging module merges the vector graph and the music file including: setting an interval of a mouth action, setting an interval of a head action, and assigning the music file to the vector graph.

4. A mobile phone, comprising an incoming call alert management unit, the incoming call alert management unit comprising:
- an image obtaining module being configured for obtaining an image from a storage of the mobile phone;
- an image converting module being configured for converting the image to a vector graph according to an algorithm for generating a vector graph, the vector graph being a cartoon image;
- a music file obtaining module being configured for obtaining plural music files from the storage of the mobile phone;
- a merging module being configured for merging the vector graph and the plural music files thereby generating an animation file, setting a caller corresponding to the animation file, and storing the animation file and the caller information in the storage; and
- a playing module being configured for invoking an animation file corresponding to a caller when an incoming call by the caller is received, selecting a music file randomly from plural music files stored in the animation file, and playing the selected music file with a vector graph in the animation file at the same time.

5. A method for displaying an incoming call alert of a mobile phone, the method comprising:
- obtaining an image from a storage of the mobile phone;
- converting the image to a vector graph according to an algorithm for generating a vector graph, the vector graph being a cartoon image;
- obtaining a music file from the storage of the mobile phone;
- merging the vector graph and the music file thereby generating an animation file, setting a caller corresponding to the animation file, and storing the animation file and the caller information in the storage; and
- invoking an animation file corresponding to a caller when an incoming call by the caller is received, and playing the animation file.

6. The method according to claim 5, wherein the algorithm for generating a vector graph is a Real-Time Video Abstraction algorithm.

7. The method according to claim 5, wherein the step of merging the vector graph and the music file further includes: setting an interval of a mouth action, setting an interval of a head action, and assigning the music file to the vector graph.

8. A method for displaying an incoming call alert of a mobile phone, the method comprising:
- obtaining an image from a storage of the mobile phone;
- converting the image to a vector graph according to an algorithm for generating a vector graph, the vector graph being a cartoon image;
- obtaining plural music files from the storage of the mobile phone;
- merging the vector graph and the plural music files thereby generating an animation file, setting a caller corresponding to the animation file, and storing the animation file and the caller information in the storage; and
- invoking an animation file corresponding to a caller when an incoming call by the caller is received, selecting a music file randomly from plural music files stored in the animation file, and playing the selected music file with a vector graph in the animation file at the same time.

* * * * *